(12) United States Patent
Jung (10) Patent No.: US 8,045,085 B2
(45) Date of Patent: Oct. 25, 2011

(54) LIQUID CRYSTAL DISPLAY MODULE AND METHOD FOR MANUFACTURING THE SAME

(75) Inventor: Sang Won Jung, Busan (KR)

(73) Assignee: LG Display Co., Ltd., Seoul (KR)

( * ) Notice: Subject to any disclaimer, the term of this patent is extended or adjusted under 35 U.S.C. 154(b) by 297 days.

(21) Appl. No.: 11/542,624

(22) Filed: Oct. 2, 2006

(65) Prior Publication Data
US 2007/0268425 A1 Nov. 22, 2007

(30) Foreign Application Priority Data

May 17, 2006 (KR) .................. 10-2006-0044306
Sep. 26, 2006 (KR) .................. 10-2006-0093578

(51) Int. Cl.
*G02F 1/1333* (2006.01)
(52) U.S. Cl. ............ 349/58; 361/679.21; 361/679.24; 361/679.3
(58) Field of Classification Search .............. None
See application file for complete search history.

(56) References Cited

U.S. PATENT DOCUMENTS

| 5,313,318 | A | * | 5/1994 | Gruenberg et al. | 349/65 |
| 6,456,343 | B2 | * | 9/2002 | Kim et al. | 349/58 |
| 6,919,940 | B2 | * | 7/2005 | Noh | 349/58 |
| 2001/0050732 | A1 | * | 12/2001 | Okamoto et al. | 349/58 |

* cited by examiner

*Primary Examiner* — Uyen Chau N Le
*Assistant Examiner* — Chad Smith
(74) *Attorney, Agent, or Firm* — Brinks Hofer Gilson & Lione

(57) ABSTRACT

Provided are a liquid crystal display module and a method for manufacturing the same. The liquid crystal display module comprises a liquid crystal panel, a backlight unit, a support main, and a top cover. The backlight unit is disposed in rear of the liquid crystal panel. The support main comprises a rectangular frame for laminating and housing the liquid crystal panel and the backlight unit, and a metal cover disposed around an outer sidewall surface and a bottom surface of the rectangular frame. The top cover covers a front edge of the liquid crystal panel, and is combined with a side part of the support main.

10 Claims, 9 Drawing Sheets

LIQUID CRYSTAL DISPLAY MODULE AND METHOD FOR MANUFACTURING THE SAME

This application claims priority under 35 U.S.C. §119(a) to both Korean Patent Application No. 10-2006-0044306 filed on May 17, 2006 and Korean Patent Application No. 10-2006-0093578 filed on Sep. 26, 2006, the entirety of which is incorporated herein by reference.

FIELD

The present invention relates to a liquid crystal display module and a method for manufacturing the same, and more particularly, to a module structure of a liquid crystal display, and a method for manufacturing a support main of a liquid crystal display module.

BACKGROUND

In general, a liquid crystal display (LCD) comprises a liquid crystal display module (LCM), a driving circuit unit for driving the liquid crystal display module, and an exterior case.

The liquid crystal display module comprises a liquid crystal panel in which liquid crystal cells are arranged in matrix between two sheets of glass substrates, and a backlight unit for irradiating light to the liquid crystal panel.

The liquid crystal display module further comprises a cover provided at outer edges of the liquid crystal panel and the backlight unit in order to prevent a light loss caused by the backlight unit and prevent damage caused by an external impact.

The above-constructed liquid crystal display module is mounted at a portable equipment such as a notebook personal computer, and is used as a display device.

A structure of a related-art liquid crystal display module will be described below in detail.

Figure 1:
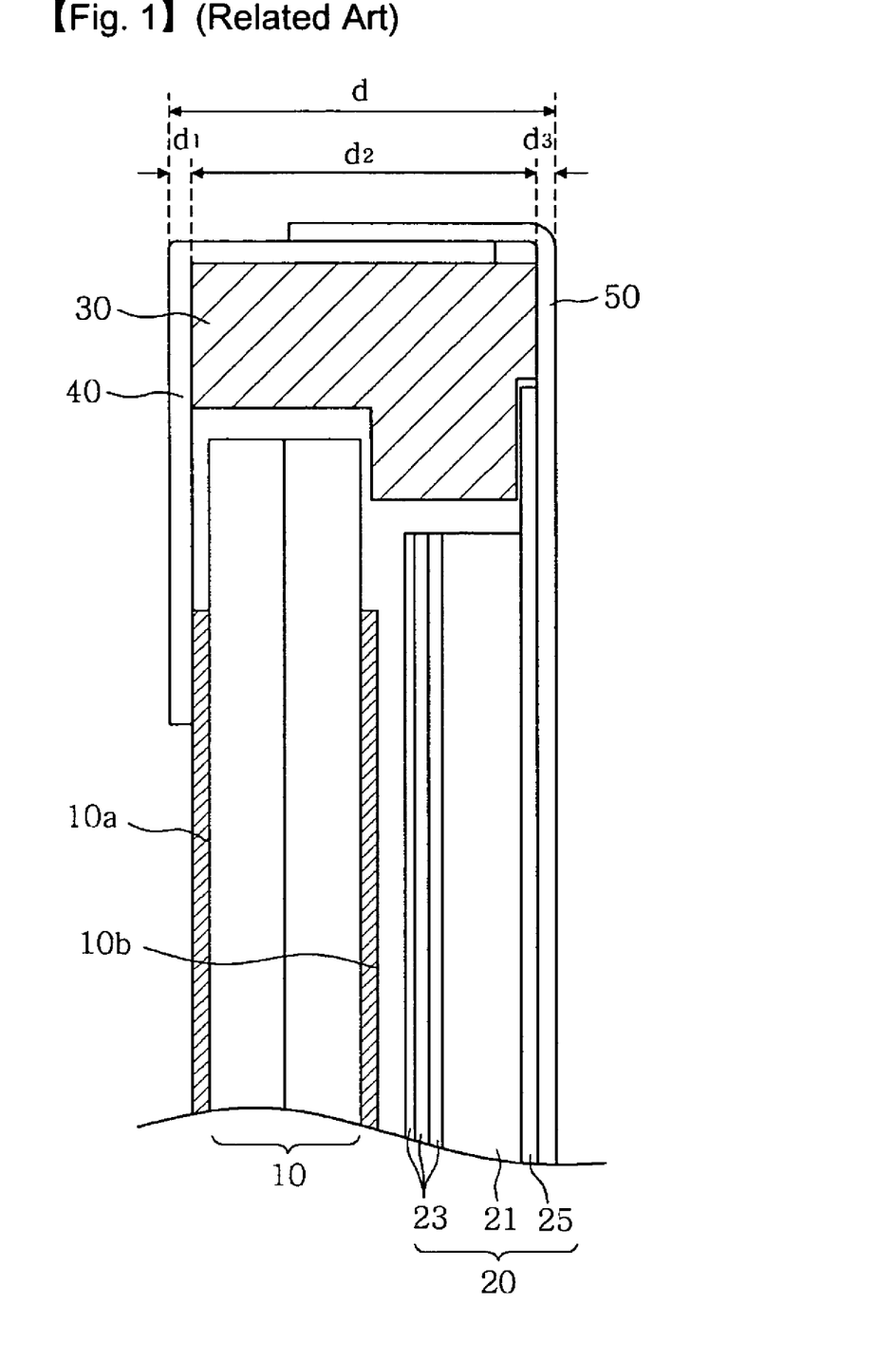
FIG. 1 is a cross-sectional view illustrating a related-art liquid crystal display module.
Figure 2:
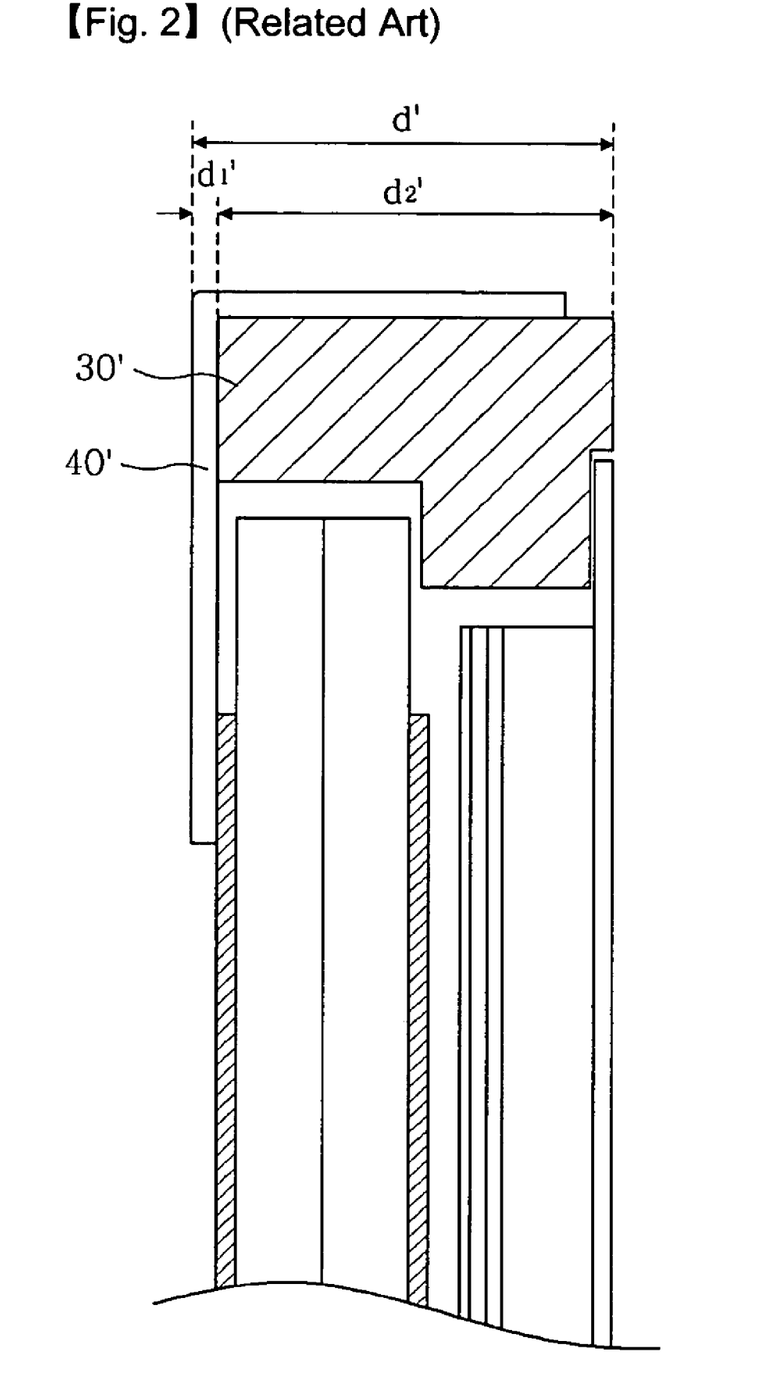
FIG. 2 is a cross-sectional view illustrating another related-art liquid crystal display module.

FIG. 1 is a cross-sectional view illustrating the related-art liquid crystal display module. FIG. 2 is a cross-sectional view illustrating another related-art liquid crystal display module.

Referring first to FIG. 1, the related-art liquid crystal display module comprises a liquid crystal panel 10 having polarization sheets 10a and 10b formed in front and rear, respectively, a backlight unit 20 provided in rear of the liquid crystal panel 10, a support main 30 for laminating and housing the liquid crystal panel 10 and the backlight unit 20 therein, a top cover 40 for covering the front surfaces of the support main 30 and the liquid crystal panel 10, and a bottom cover 50 for covering a rear surface of the support main 30 and a side surface of the top cover 40.

The support main 30 is provided as a mold, and has a stepped end jaw formed on an inner sidewall surface to laminate the liquid crystal panel 10 and the backlight unit 20 therein. Thus, a backlight unit 20 comprising a light guide plate 21, a plurality of optical sheets 23, a reflection sheet 25, and a lamp housing (not shown) is housed at an inner lowermost layer of the support main 30. The liquid crystal panel 10 is laminated thereon.

A bottom cover 50 is manufactured by bending a stainless steel (SUS) sheet. The bottom cover 50 is advantageous in enhancing a rigidity of the liquid crystal display module owing to its material characteristic of high hardness.

The above constructed related-art liquid crystal display module has a total thickness (d) summing up a thickness ($d_1$) of the top cover 40, a height ($d_2$) of the support main 30, and a thickness ($d_3$) of the cover bottom 50.

However, according to a recent trend to slim the liquid crystal display module, rather than a structure shown in FIG. 1, a structure shown in FIG. 2 in which the bottom cover 50 is eliminated and a total thickness of the liquid crystal display module is reduced is being suggested.

In other words, as shown in the cross-sectional view of FIG. 2, the total thickness (d') of the liquid crystal display module is comprised of a thickness ($d_1'$) of a top cover 40' and a height ($d_2'$) of a support main 30'. Accordingly, the liquid crystal display module has a thin type structure with its thickness reduced as much as the thickness ($d_3$ of FIG. 1) of the bottom cover (50 of FIG. 1)

However, the related-art liquid crystal display module is weak in rigidity due to the reduced thickness since there is no bottom cover 50. Thus, the liquid crystal display module has a drawback that it suffers from damage or destruction even by a weak impact.

SUMMARY

A liquid crystal display module comprises a liquid crystal panel, a backlight unit, a support main, and a top cover. The backlight unit is disposed in rear of the liquid crystal panel. The support main comprises a rectangular frame for laminating and housing the liquid crystal panel and the backlight unit, and a metal cover disposed around an outer sidewall surface and a bottom surface of the rectangular frame. The top cover covers a front edge of the liquid crystal panel, and is combined with a side part of the support main.

In another aspect, a liquid crystal display module comprises a liquid crystal panel, a backlight unit, a support main, and a top cover. The backlight unit is disposed in rear of the liquid crystal panel. The support main comprises a rectangular frame for laminating and housing the liquid crystal panel and the backlight unit, and a metal cover disposed around an outer sidewall surface, a bottom surface, and a top surface of the rectangular frame. The top cover covers a front edge of the liquid crystal panel, and is combined with a side part of the support main.

In further another aspect, there is provided a method for manufacturing a support main of a liquid crystal display module. The method comprises inserting a metal cover to a mold frame of a rectangular frame, injecting a molding resin to the mold frame of the rectangular frame, and molding the rectangular frame such that the rectangular frame and the metal cover are integrally adhered.

It is to be understood that both the foregoing general description and the following detailed description are exemplary and explanatory and are intended to provide further explanation of the invention as claimed.

BRIEF DESCRIPTION OF THE DRAWINGS

The invention will be described in detail with reference to the following drawings in which like numerals refer to like elements.

DETAILED DESCRIPTION

Preferred embodiments of the present invention will be described in a more detailed manner with reference to the drawings.

Figure 3:
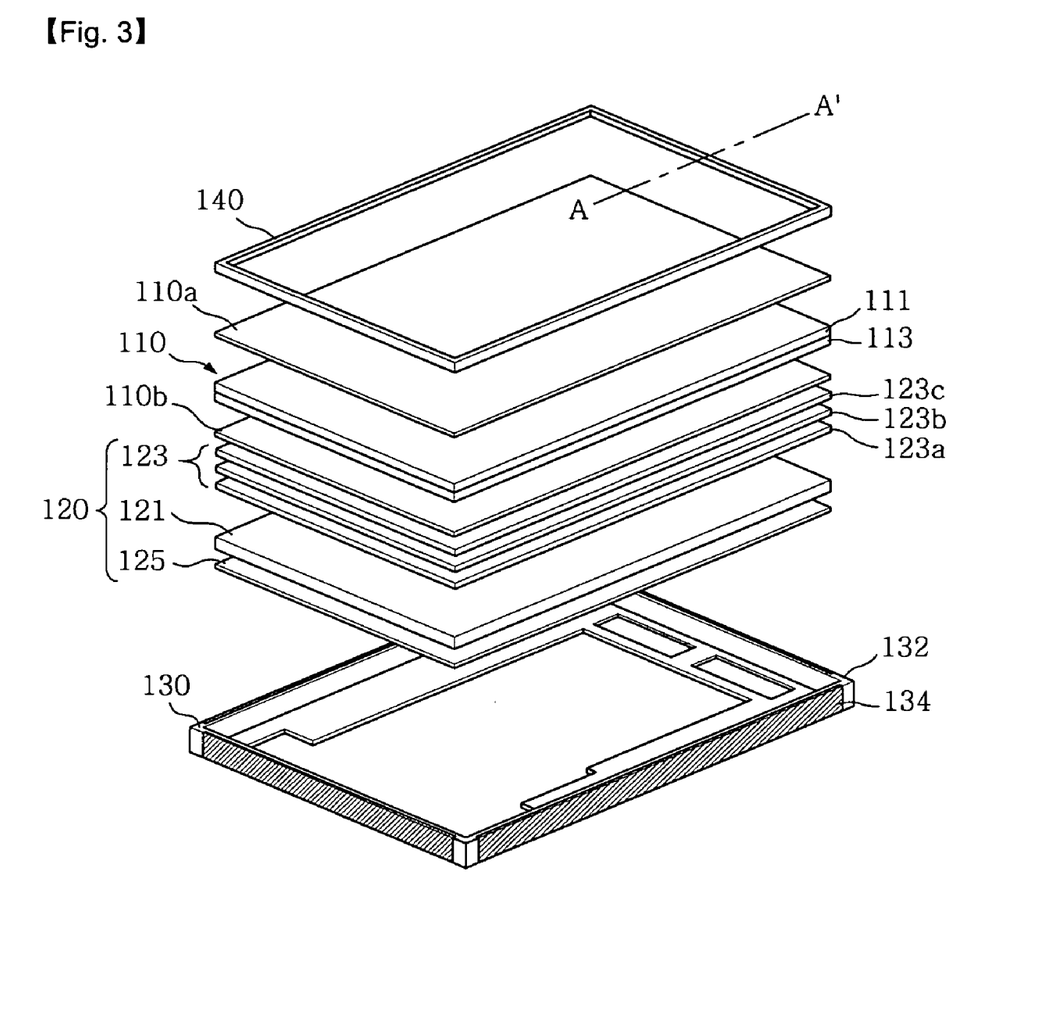
FIG. 3 is a general perspective view illustrating a liquid crystal display module according to one embodiment of the present invention.
Figure 4:
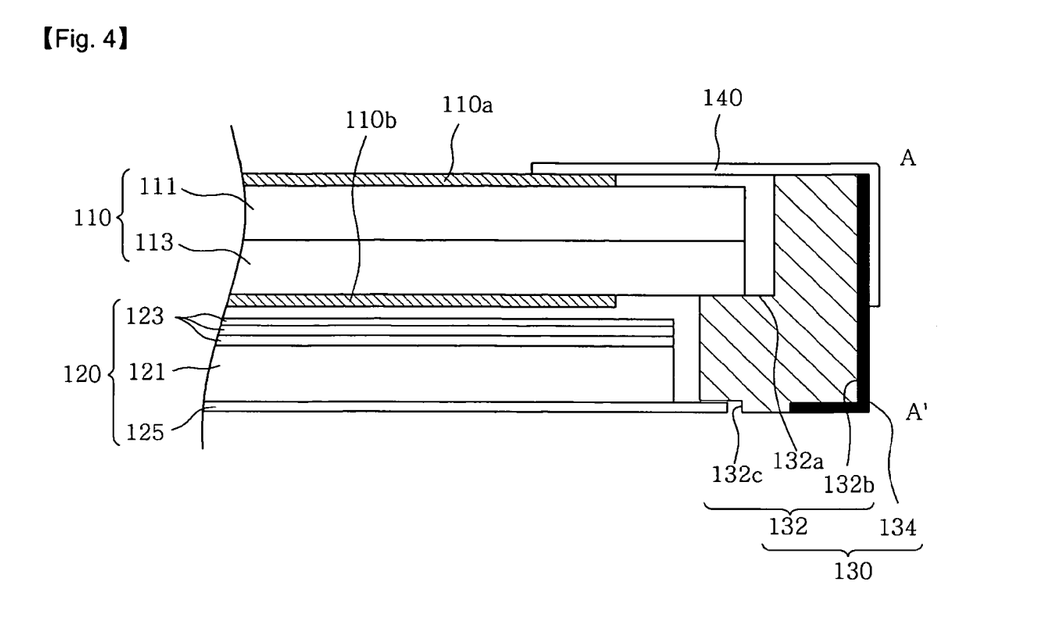
FIG. 4 is a cross-sectional view illustrating an assembly taken along line A-A' in FIG. 3.

FIG. 3 is a general perspective view illustrating a liquid crystal display module according to one embodiment of the present invention. FIG. 4 is a cross-sectional view illustrating an assembly taken along line A-A' in FIG. 3.

Referring to FIGS. 3 and 4, the liquid crystal display module according to one embodiment of the present invention comprises a liquid crystal panel 110, a backlight unit 120 for providing light to the liquid crystal panel 110, a support main 130 for housing the liquid crystal panel 110 and the backlight unit 120, and a top cover 140 covering a front surface of the liquid crystal panel 110, and combined with a side part of the support main 130.

The liquid crystal panel 110 comprises a thin film transistor array substrate 113 where a plurality of thin film transistors is arranged in matrix, a color filter substrate 111 facing the thin film transistor array substrate 113 and provided with a color filter, and a liquid crystal layer (not shown) provided between the thin film transistor array substrate 113 and the color filter substrate 111.

Polarization sheets 110a and 110b are attached to front and rear surfaces of the liquid crystal panel 110, respectively.

The backlight unit 120 comprises a light guide plate 121 for guiding light emitted from a lamp (not shown) toward the liquid crystal panel 110, a plurality of optical sheets 123 for scattering the light exiting from the light guide plate 121, and irradiating the scattered light to the liquid crystal panel 110, and a reflection sheet 125 for reflecting the light exiting from a rear surface of the light guide plate 121.

In detail, the plurality of optical sheets 123 is to provide a light source having a substantially uniform brightness distribution to a display surface of the liquid crystal panel 110. Thus, the plurality of optical sheets 123 can comprise a diffusion sheet 123a and a prism sheet 123b to increase a scattering effect of the light exiting from the light guide plate 121. A protective sheet 123c can be added to a front surface of the prism sheet 123b.

The top cover 140 is manufactured in a rectangular frame type having a plan part and a side part bent vertically. The top cover 140 covers a front edge of the liquid crystal panel 110 and a side part of the support main 130, and is combined with a metal cover 134 of the support main 130.

A means (not shown) for connecting the top cover 140 with the metal cover 134 can employ a hook or a protrusion, and a screw joint.

The support main 130 comprises a rectangular frame 132 for laminating and housing the liquid crystal panel 110 and the backlight unit 120, and the metal cover 134 formed around an outer sidewall surface and a bottom surface of the rectangular frame 132.

In a detailed description, as shown in FIG. 4, the rectangular frame 132 comprises a stepped end jaw 132a formed on an inner sidewall surface, a first insert groove 132b extending to the bottom surface and grooved around the outer sidewall surface, and a locking jaw 132c formed on a rear surface around an inner edge.

The stepped end jaw 132a is to laminate the liquid crystal panel 110 and the backlight unit 120. The first insert groove 132b is a space to insert the metal cover 134. The locking jaw 132c is to seat the reflection sheet 125 such that a rear surface of the reflection sheet 125 is placed lower than a rear surface of the support main 130, thereby preventing outside protrusion.

The first insert groove 132b can have a size and a depth corresponding to a thickness of the metal cover 134.

The locking jaw 132c can have a height corresponding to a thickness of the reflection sheet 125.

Accordingly, the backlight unit 120 comprising the reflection sheet 125, the light guide plate 121, the optical sheet 123, and a lamp housing (not shown) is mounted at an inner lowermost layer of the rectangular frame 132. The liquid crystal panel 110 is laminated on the backlight unit 120. The polarization sheets 110a and 110b are attached to the front and rear surfaces of the liquid crystal panel 110, respectively.

The reflection sheet 125 is put on the locking jaw 132c of the rectangular frame 132 and seated, or is attached to the locking jaw 132c using an adhesive unit.

Figure 5:
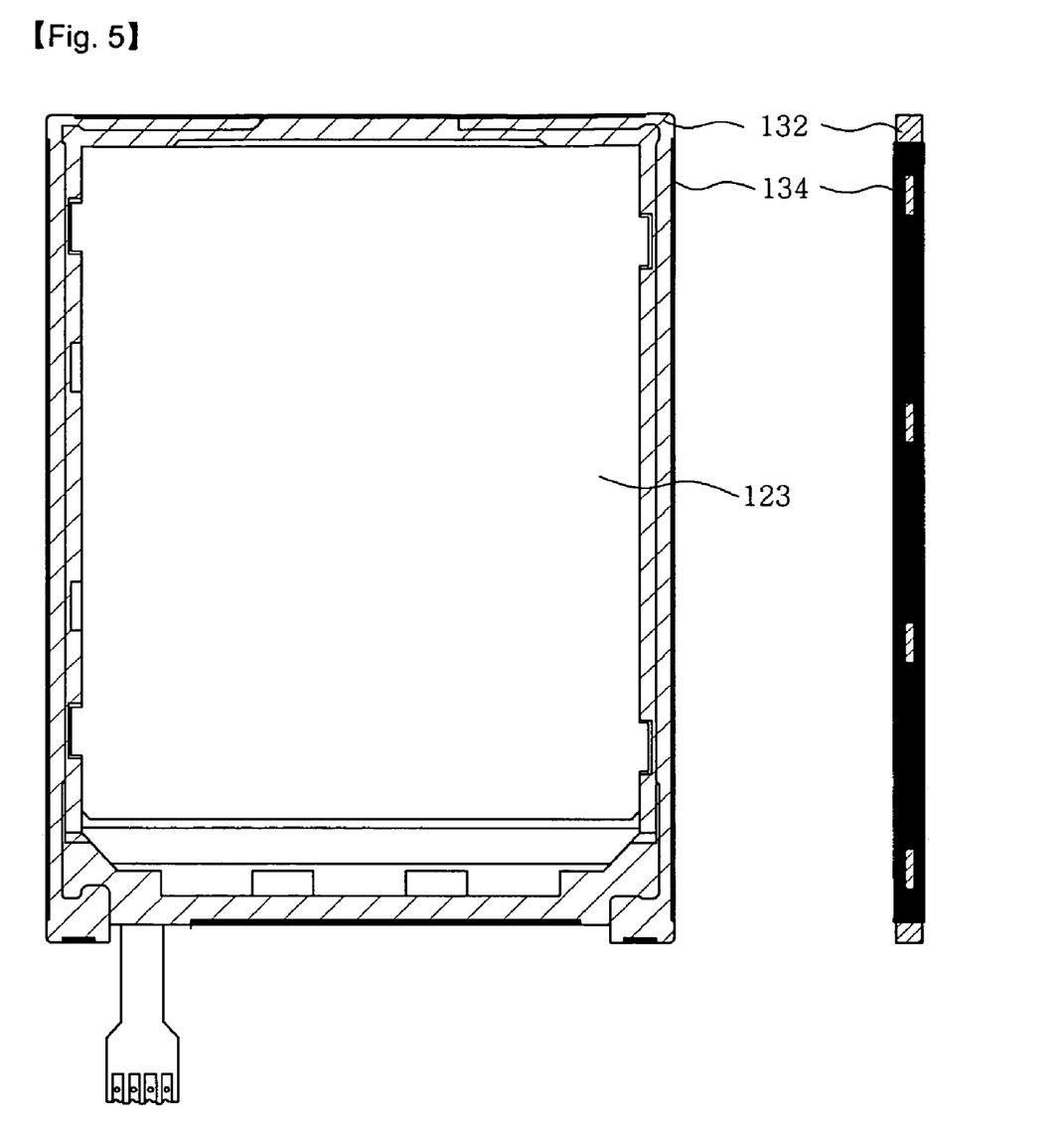
FIG. 5 is a plan view and a side view illustrating a support main of a liquid crystal display module according to one embodiment of the present invention.
Figure 6:
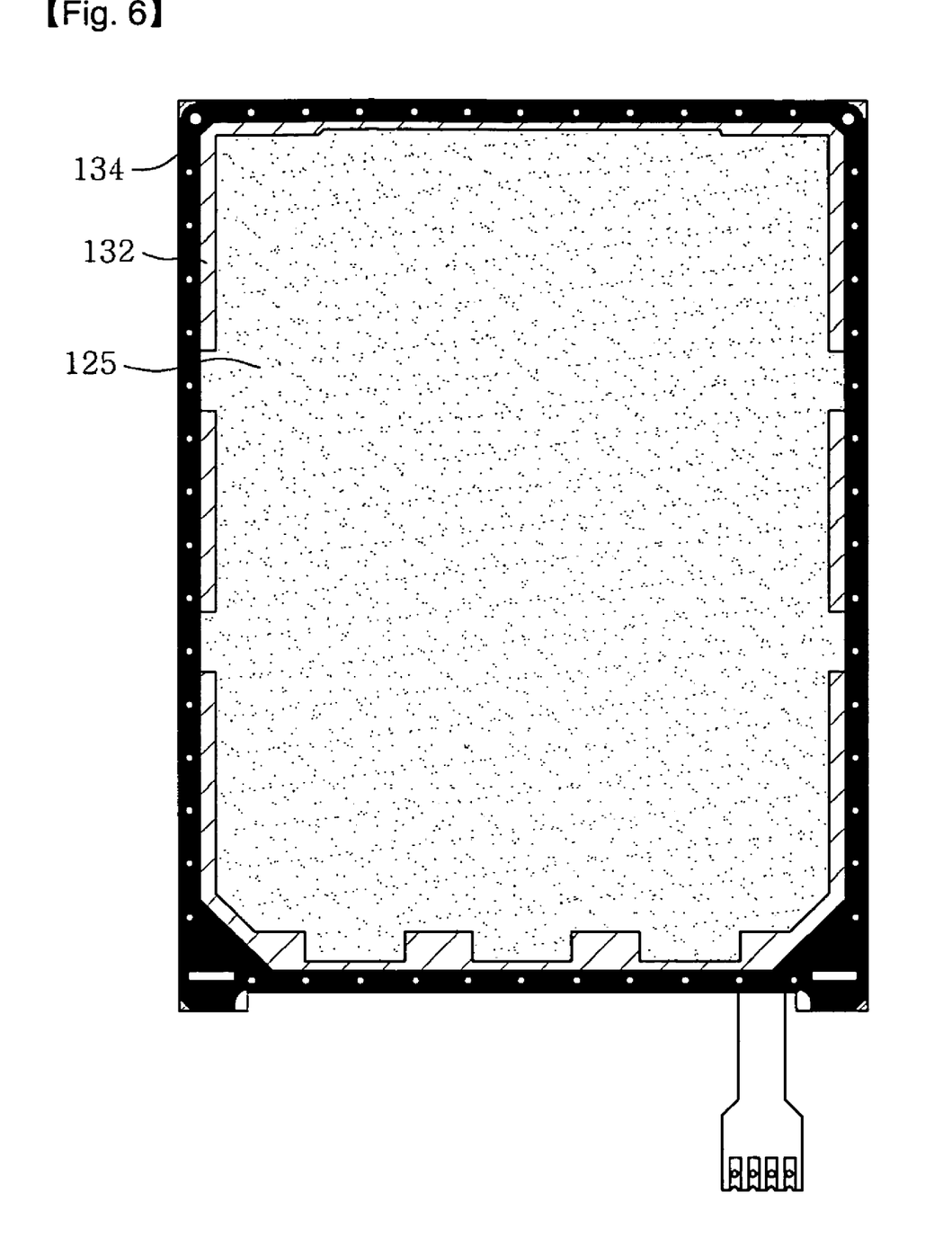
FIG. 6 is a rear view illustrating a structure of a support main of a liquid crystal display module according to one embodiment of the present invention.

FIG. 5 is a plan view and a side view illustrating the support main of the liquid crystal display module according to one embodiment of the present invention. FIG. 6 is a rear view illustrating the support main of the liquid crystal display module according to one embodiment of the present invention.

Referring to FIGS. 5 and 6, the metal cover 134 is provided such that it covers the outer sidewall surface and the bottom surface of the rectangular frame 132. The metal cover 134 is inserted into the first insert groove (132b in FIG. 4) of the rectangular frame 132, and is fixed to the rectangular frame 132.

The metal cover 134 has a vertical section of a '⌐' shape. The metal cover 134 is formed of stainless steel (SUS) and reinforces rigidity of the liquid crystal display module.

The metal cover 134 can be formed along the outer sidewall surface of the rectangular frame 132 as a whole, or can be formed only at a portion of the outer sidewall surface excepting corner portions of the rectangular frame 132.

The metal cover 134 can have the same thickness as a bottom cover (50 in FIG. 1), and can have a thickness of about 0.1 mm to 0.2 mm in application to a miniature model, but this does not limit the scope of the present invention.

The above constructed support main is manufactured using an insert injection molding method.

In other words, the metal cover 134 formed of stainless steel is inserted into a mold frame having a shape of the rectangular frame 132, and a molding resin is injected into the mold frame to integrally adhere the rectangular frame 132 and the metal cover 134.

Thus, the metal cover 134 of the stainless steel and the rectangular frame 132 that is a mold, are firmly adhered on their contacting surfaces, thereby preventing a minute gap between the metal cover 134 and the rectangular frame 132 and thus, preventing the metal cover 134 and the rectangular frame 132 from freely moving due to external impact. Further, the metal cover 134 and the rectangular frame 132 prevent the backlight unit 120 and the liquid crystal panel 110 housed inside from being damaged by the free movement and external impact, and reinforce the rigidity of the liquid crystal display module.

Figure 7:
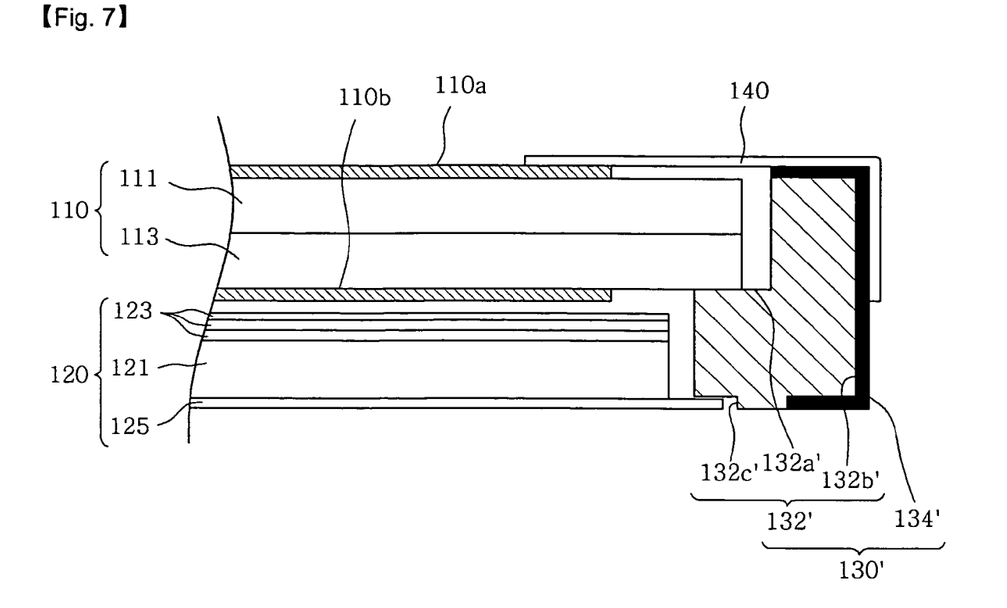
FIG. 7 is a cross-sectional view illustrating a liquid crystal display module according to another embodiment of the present invention.
Figure 8:
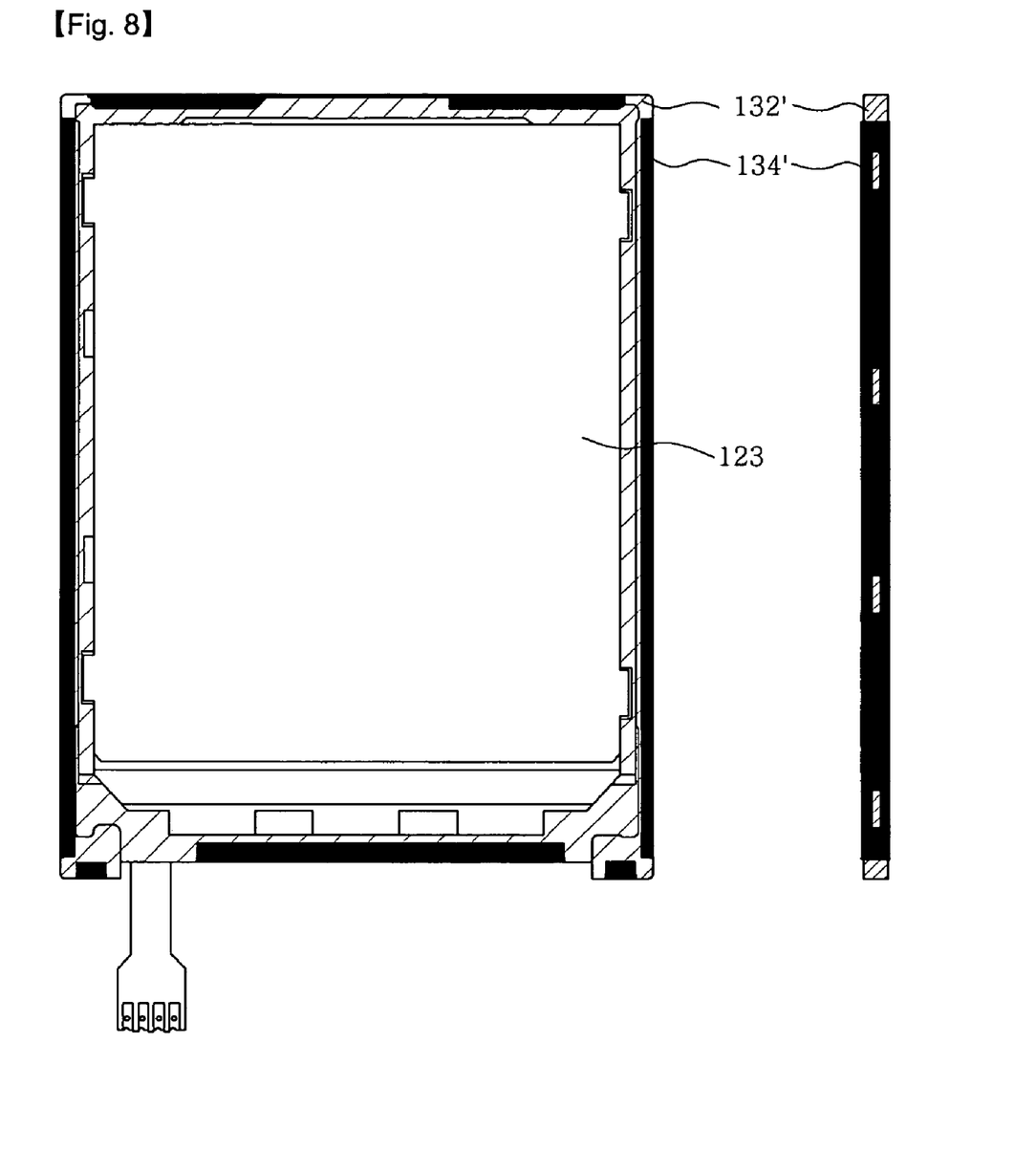
FIG. 8 is a plan view and a side view illustrating a support main of a liquid crystal display module according to another embodiment of the present invention.
Figure 9:
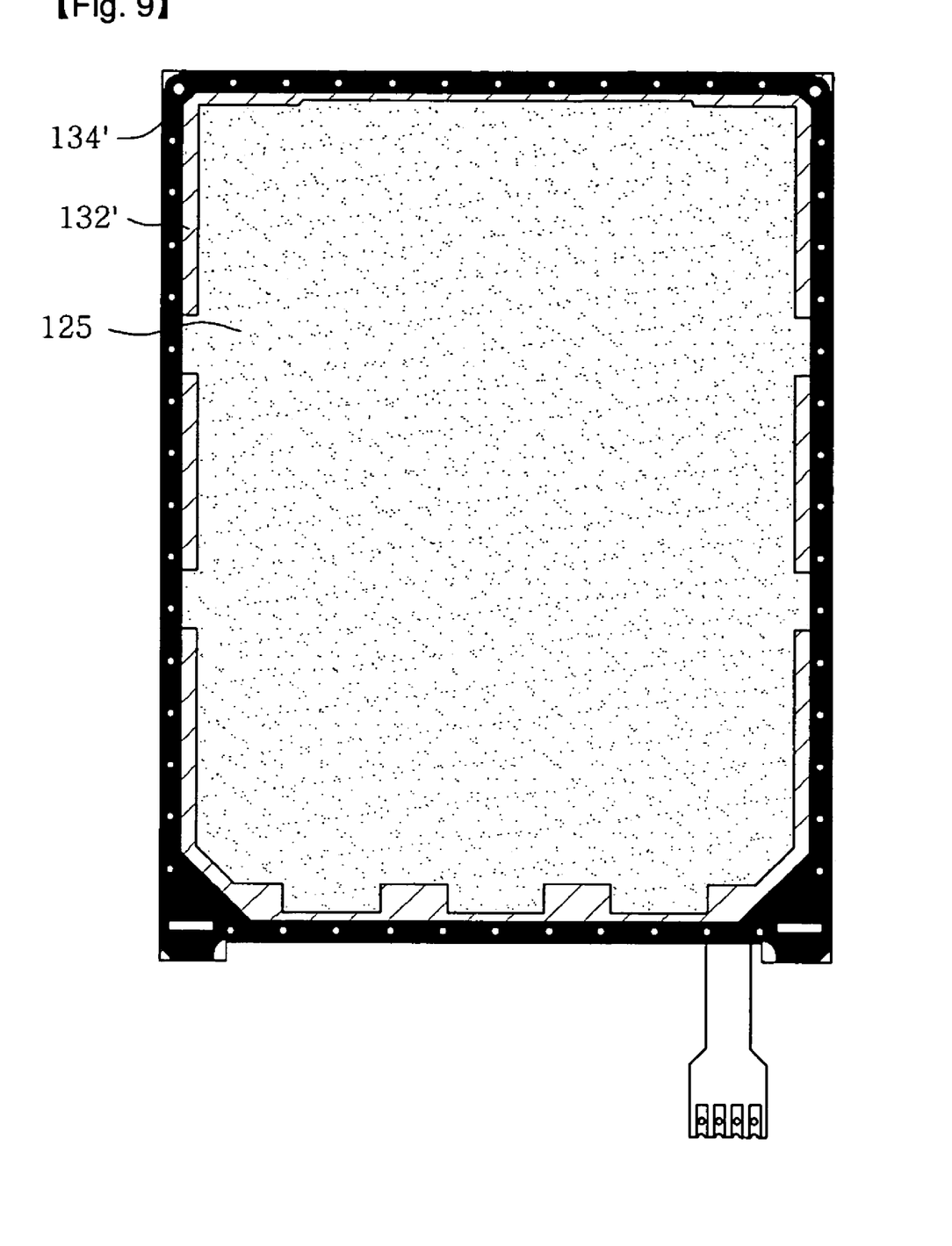
FIG. 9 is a rear view illustrating a support main of a liquid crystal display module according to another embodiment of the present invention.

FIG. 7 is a cross-sectional view illustrating a liquid crystal display module according to another embodiment of the present invention. FIG. 8 is a plan view and a side view illustrating a support main of the liquid crystal display module according to another embodiment of the present invention. FIG. 9 is a rear view illustrating the support main of the liquid crystal display module according to another embodiment of the present invention.

FIGS. 7 to 9 show another modified example of a structure of the support main 130' provided to the liquid crystal display module according to another embodiment of the present invention.

In other words, as shown in FIG. 7, the liquid crystal display module according to another embodiment of the present invention comprises a liquid crystal panel 110, a backlight unit 120 for providing light to the liquid crystal panel 110, the support main 130' for housing the liquid crystal panel and the backlight unit 120, and a top cover 140 for covering a front surface of the liquid crystal panel 110, and combined with a side part of the support main 130'.

The support main 130' comprises a rectangular frame 132' provided as a mold in the same manner as the aforementioned embodiment, and a metal cover 134' integrally formed around an outer surface of the rectangular frame 132'.

The support main 130' is formed by inserting the metal cover 134' to a mold frame of the rectangular frame 132' before injection. Therefore, the metal cover 134' is integrally adhered to an outer wall of the rectangular frame 132'. This manufacturing process is similar to the description above and thus, will be omitted.

The rectangular frame 132' comprises a stepped end jaw 132a' formed on an inner sidewall surface; a second insert groove 132b' provided around outer wall surfaces, that is, an outer sidewall surface, a bottom surface, and a top surface, and a locking jaw 132c' formed on a rear surface around an inner edge.

The stepped end jaw 132a' is used as a place to seat and house the liquid crystal panel 110 and the backlight unit 120 as shown.

The second insert groove 132b', which is a space to insert and integrally combine the metal cover 134', can have a size and a depth corresponding to a thickness of the metal cover 134'.

The locking jaw 132c can have a height corresponding to a thickness of the reflection sheet 125.

As shown in FIGS. 8 and 9, the metal cover 134' is provided such that it covers the outer sidewall surface, the bottom surface, and the top surface of the rectangular frame 132'. The metal cover 134' is inserted into the second insert groove (132b') of the rectangular frame 132', and is fixed to the rectangular frame 132'.

The metal cover 134' has a vertical section of a 'ㄷ'shape. The metal cover 134 is formed of stainless steel and reinforces rigidity of the liquid crystal display module.

The metal cover 134' can be formed only at a portion excepting corner portions, that is, not formed at the outer wall surface of the rectangular frame 132' as a whole. Alternately, the metal cover 134' can be formed around the whole outer wall surface of the rectangular frame 132'.

The liquid crystal panel 110, the backlight unit 120, and the top cover 140 are the same as those in the aforementioned embodiment, denoted by the same reference numerals.

According to the embodiments of the present invention, the above constructed liquid crystal display modules provide the first insert groove 132b and the second insert groove 132b' to the support mains 130 and 130', respectively, and combine the metal covers 134 and 134' to the first and second insert groove 132b and 132b', respectively, and employ a stainless steel cover, thereby reducing the total thickness of the liquid crystal display module by the same effect that the related-art bottom cover is eliminated. At the same time, the rigidity of the liquid crystal display module can be reinforced.

A method for assembling the liquid crystal display module according to the embodiments of the present invention will be described as follows.

The support main integrated with the metal cover is prepared outside of the rectangular frame in which the stepped end jaw is formed on the inner sidewall surface. The light guide plate is housed at the inner lowermost layer of the support main. The plurality of optical sheets is laminated on the light guide plate. The reflection sheet is disposed on the rear surface of the light guide plate facing the plurality of optical sheets. The backlight unit is housed within the support main. The liquid crystal panel is laminated on the plurality of optical sheets. Here, the liquid crystal panel is housed and seated on the stepped end jaw. The top cover is assembled and combined with the side part of the support main to cover the front edge of the liquid crystal panel.

The reflection sheet can be seated on the locking jaw formed along the inner edge on the rear surface of the support main, or can be adhered and fixed to the locking jaw.

According to the present invention, the support main can be reinforced with the metal cover formed of stainless steel, and the bottom cover and the support main can be integrally formed, thereby making the conventional bottom cover unnecessary and thus, reducing the total thickness of the liquid crystal display module.

Further, comparing to the liquid crystal display module without a bottom cover, the use of the metal cover formed of stainless steel can both keep a thin type structure of the liquid crystal display module and reinforce the rigidity of the liquid crystal display module. Furthermore, a reduction of the stainless steel can save manufacturing cost.

The invention being thus described, it will be obvious that the same may be varied in many ways. Such variations are not to be regarded as a departure from the spirit and scope of the invention, and all such modifications as would be obvious to one skilled in the art are intended to be included within the scope of the present invention.

What is claimed is:
1. A liquid crystal display module comprising:
a liquid crystal panel;
a backlight unit disposed in rear of the liquid crystal panel;
a support main comprising:
a rectangular frame for laminating and housing the liquid crystal panel and the backlight unit, the rectangular frame having a bottom surface, outer lateral end surfaces perpendicular to the bottom surface, an outer front end surface perpendicular to the bottom surface and the outer lateral end surfaces, and a top surface parallel to the bottom surface; and
a metal cover disposed around the outer lateral end surfaces, the outer front end surface, a portion of the bottom surface, and a portion of the top surface of the rectangular frame; and a top cover that covers a front edge of the liquid crystal panel, and is combined with a side part of the support main, wherein the metal cover directly contacts the outer lateral end surfaces, the bottom surface, the outer front end surface and the top surface of the rectangular frame with no gap therebetween.

2. The liquid crystal display module of claim 1, wherein the rectangular frame has a stepped end jaw formed on an inner sidewall surface, and has a second insert groove to insert the metal cover, disposed along the outer lateral end surface, the bottom surface, and the top surface.

3. The liquid crystal display module of claim 2, wherein the second insert groove is adjustable corresponding to a thickness of the metal cover.

4. The liquid crystal display module of claim 1, wherein the metal cover has a vertical section of a '⊏'shape.

5. The liquid crystal display module of claim 1, wherein the support main further comprises a locking jaw configured to accommodate a reflection sheet of the backlight unit, along an inner edge on a rear surface of the rectangular frame.

6. The liquid crystal display module of claim 1, wherein the metal cover is substantially disposed along the outer lateral end surface of the rectangular frame.

7. The liquid crystal display module of claim 1, wherein the metal cover is disposed at the outer lateral end surface excepting corners of the rectangular frame.

8. The liquid crystal display module of claim 1, wherein the metal cover is formed of stainless steel.

9. The liquid crystal display module of claim 1, wherein the outer front end surface of the rectangular frame extends from the bottom surface in a substantially vertical direction.

10. The liquid crystal display module of claim 1 wherein the metal cover is integrally formed with rectangular frame and adhered thereto.

* * * * *